United States Patent
Cohen et al.

(10) Patent No.: US 8,978,068 B2
(45) Date of Patent: Mar. 10, 2015

(54) METHOD, SYSTEM AND APPARATUS FOR PROVIDING MULTIMEDIA DATA CUSTOMIZED MARKETING

(71) Applicants: Beniamin Cohen, Espoo (FI); Vesa Luiro, Berlin (DE)

(72) Inventors: Beniamin Cohen, Espoo (FI); Vesa Luiro, Berlin (DE)

( * ) Notice: Subject to any disclaimer, the term of this patent is extended or adjusted under 35 U.S.C. 154(b) by 0 days.

(21) Appl. No.: 13/855,894

(22) Filed: Apr. 3, 2013

(65) Prior Publication Data

US 2014/0304734 A1  Oct. 9, 2014

(51) Int. Cl.
| | |
|---|---|
| H04N 5/445 | (2011.01) |
| G06Q 30/00 | (2012.01) |
| H04N 21/81 | (2011.01) |
| H04N 21/45 | (2011.01) |
| H04N 21/258 | (2011.01) |
| H04N 21/2668 | (2011.01) |
| H04N 21/658 | (2011.01) |
| H04N 7/10 | (2006.01) |

(52) U.S. Cl.
CPC ......... *H04N 21/812* (2013.01); *H04N 21/4532* (2013.01); *G06Q 30/00* (2013.01); *H04N 21/25883* (2013.01); *H04N 21/25891* (2013.01); *H04N 21/2668* (2013.01); *H04N 21/6582* (2013.01)
USPC .............. 725/46; 725/34; 725/36; 705/14.53; 705/14.4; 705/14.41; 705/14.49; 705/14.58; 705/14.64; 705/14.65; 705/14.66; 705/14.67

(58) Field of Classification Search
USPC ......... 725/34, 36, 46; 705/14.4, 14.41, 14.49, 705/14.53, 14.58, 14.64, 14.65, 14.66, 705/14.67; 707/732
See application file for complete search history.

(56) References Cited

U.S. PATENT DOCUMENTS

| | | | | |
|---|---|---|---|---|
| 6,477,509 | B1 * | 11/2002 | Hammons et al. | 705/26.8 |
| 7,975,150 | B1 * | 7/2011 | Lillibridge et al. | 713/193 |
| 2005/0251408 | A1 * | 11/2005 | Swaminathan et al. | 705/1 |
| 2006/0248558 | A1 * | 11/2006 | Barton et al. | 725/46 |
| 2007/0088603 | A1 * | 4/2007 | Jouppi et al. | 705/14 |
| 2008/0249851 | A1 * | 10/2008 | Angell et al. | 705/14 |
| 2009/0094158 | A1 * | 4/2009 | Fein et al. | 705/50 |
| 2012/0130810 | A1 * | 5/2012 | Kilgore et al. | 705/14.53 |
| 2012/0253923 | A1 * | 10/2012 | Durvasula et al. | 705/14.43 |
| 2013/0139193 | A1 * | 5/2013 | Fan et al. | 725/14 |

* cited by examiner

*Primary Examiner* — Hoang-Vu A Nguyen-Ba
(74) *Attorney, Agent, or Firm* — Ziegler IP Law Group, LLC.

(57) ABSTRACT

A method for providing customized marketing associated to multimedia broadcasting, comprising: receiving multimedia broadcast data at a multimedia broadcast receiver apparatus; determining user information of the multimedia broadcast receiver apparatus; transmitting the user information to a service server; defining customized marketing information associated to the received multimedia broadcast data based on the user information; transmitting the customized marketing information to a user apparatus; determining, by the user apparatus, marketing information presentation settings defined by a user; and providing the customized marketing information via a user interface of the user apparatus based on the marketing information presentation settings.

32 Claims, 7 Drawing Sheets

METHOD, SYSTEM AND APPARATUS FOR PROVIDING MULTIMEDIA DATA CUSTOMIZED MARKETING

TECHNICAL FIELD

The present application generally relates to a method, a system and an apparatus for providing multimedia data.

BACKGROUND ART

Today, television provides means to mold opinions and as such acts as one of the major vehicles for marketing and advertising. Television programs are delivered to people mainly through broadcasting model.

Touch screen devices are increasingly popular devices which among other things are used to enjoy audiovisual content like videos and similar multimedia or get information about products and services, e.g. from the Internet. Touch screen devices can also act as so-called second screen devices for television, meaning that people can actively seek information about a movie or its actors while watching the movie from the primary screen. Such information can also be brought to their attention and even synced with the television program or other video that the users are watching.

A commercial advertisement on television is a special span of "television programming" produced and paid for by an organization, which conveys a message, typically to market a product or service. Marketing revenue provides a significant portion of the funding for most privately owned television networks.

The challenge of today is how to serve the consumer with information that is customized or personalized, relevant, timely and in some instances immediately actionable and in a manner that is non-disturbing. The problems relate to various parties including but not limited to consumers/viewers, marketers, TV broadcasters, networks etc.

Television advertising and marketing in the U.S. and in other countries involves two main tasks: creating a television advertisement or marketing information and placing the advertisement or marketing information on television via a targeted air time media buy that reaches the desired customer.

The vast majority of television marketing information today consists of brief advertising or marketing spots, ranging in length from a few seconds to several minutes or to even program-length infomercials. Advertisements or marketing information of this sort have been used to promote a wide variety of goods, services and ideas since the dawn of television. Because a single television advertisement can be broadcast repeatedly over the course of weeks, months, and even years television advertisement production studios often spend enormous sums of money in the production of one single thirty-second television spot.

The viewership of television programming, as measured by media measurement is often used as a metric for television advertisement or marketing information placement, and consequently, for the rates charged to advertisers to air within a given network, television program, or time of day.

For each hour in a television broadcast day, advertisements or marketing information take up a fairly consistent proportion of the time. As an example a typical 30 minute block of time can include 22 minutes of programming and eight minutes of advertisements/marketing information—six minutes for national advertising or marketing and two minutes for local advertising or marketing. TV commercials are fairly ubiquitous and not only broadcasted in between of the television shows. TV commercials are displayed in the middle, in between or simultaneously with TV programming.

Commercials might be regarded as annoying or disturbing for many reasons. They often unnecessarily stop the flow of TV program; either at climaxes of the plot or at a major turning point in the show, which many people find exciting or entertaining to watch. In that instance the commercials are simply nuisance and deteriorate the entertainment or information value of the programming negatively. People have been annoyed because the volume of the commercials tends to be louder than the main programming.

The core reason people find advertisements/marketing information annoying is that the advertisement/marketing information offer is not of interest at that moment or at all, or the presentation is unclear. A typical viewer has seen enough advertisements/marketing information to anticipate that most advertisements will be bothersome, prompting the viewer to be mercilessly selective in their viewing. Conversely, if advertisement/marketing information strikes a chord with the viewer, or has entertainment value beyond the basic message, then viewers tend to stay with the advertisement/marketing information, perhaps even looking forward to viewing it again. Relevant ads are better than non-relevant ones.

In a nutshell all of the above nuisance factors are annoying and disturbing from the viewer's perspective but are not good from marketer's point of view either.

Different recording or "time-shifting" devices have gained popularity among the viewers perhaps also due to some of the above mentioned reasons—commercials regarded as disturbing or annoying—and viewers then watch the programming at a time suitable for them and skip all the advertisements/marketing information or they are left watching old advertisements which are not timely and therefore non-relevant. An advertisement can be non-relevant if it is non-actionable due to the time lapse like a Christmas advertisement proposing a consumer to do something before Christmas but if the advertisement is received after Christmas it is of no use. This is obviously not good for marketers.

Television is by nature a mass media through which information can be served to the public. One additional problem with TV as a channel for advertisement is that it is by nature a push media that cannot be customized for any subset of viewers although different viewers or groups would have slightly different needs and preferences. These needs and preferences should be more satisfactorily addressed by the marketer. That is also one reason why the number of viewers within the target demographic is generally regarded as more important to ad revenues than total viewers. Targeted reach is generally better than "just" reach.

As television is traditionally a passive media the viewers are often left without any means to immediately or at all act upon in accordance with how the marketing communication/commercials propose or the marketers would like them to do.

On the other hand a marketer cannot even be whether the information that they want to deliver to the consumer is actually seen by the consumer at all or whether it is seen by the optimal or during a certain period of or specific time.

The above mentioned problems are not separate from each other but can appear in any number of permutations and form a complex and interdependent set of problems that should be solved.

In a nutshell consumers are left out from some of the most interesting and acute advertisements and at the same time marketers are unable to reach the potentially interested users effectively. There is clearly a need for a new architecture and solution to manage the challenges that consumers are facing today when being provided advertisements or marketing information together with some multimedia broadcast or transmission. Furthermore, improved methods for synchronization for available advertisements or marketing information are needed.

SUMMARY

According to a first example aspect of the invention there is provided a method for providing customized marketing associated to multimedia broadcasting, comprising:

receiving multimedia broadcast data at a multimedia broadcast receiver apparatus;

determining user information of the multimedia broadcast receiver apparatus;

transmitting the user information to a service server;

defining customized marketing information associated to the received multimedia broadcast data based on the user information;

transmitting the customized marketing information to a user apparatus;

determining, by the user apparatus, marketing information settings; and providing the customized marketing information via a user interface of the user apparatus based on the marketing information settings.

In an embodiment, the user apparatus being different than the multimedia broadcast receiver apparatus.

In an embodiment, the user apparatus comprising the multimedia broadcast receiver apparatus.

In an embodiment, the marketing information presentation settings comprise at least one of the following:

user interface selection information for identifying the user interface on which the customized marketing information being provided;

outlook information for defining the outlook of the customized marketing information being provided;

frame information for defining the frame of the customized marketing information being provided; and timing information for defining timing of the customized marketing information being provided to the user.

In an embodiment, the marketing information settings being defined by at least one of the following:

the user;

the service provider; and the marketing information provider.

In an embodiment, the user information comprises at least one of the following:

user sex;

user age;

user place of birth;

user location;

user points of interests;

user profile information from an external service; and user history of received multimedia broadcast data.

In an embodiment, the external service comprising at least one of the following:

a social network service;

a cloud service;

a bank service; and a multimedia streaming service.

In an embodiment, the method further comprises:

providing the customized marketing information with reduced disruption to the received multimedia broadcast data.

In an embodiment, the customized marketing information being provided with at least one of the following ways:

before providing the received multimedia broadcast data to the user;

during a break in providing the received multimedia broadcast data to the user;

after providing the received multimedia broadcast data to the user; and via a different user interface than providing the received multimedia broadcast data to the user.

In an embodiment, the method further comprises:

synchronizing the customized marketing information with the received multimedia broadcast data.

In an embodiment, the multimedia broadcast receiver comprising an A/V output apparatus or a multimedia processing apparatus.

In an embodiment, the user apparatus comprises a multimedia controlling apparatus.

In an embodiment, the method further comprises:

defining customized marketing information associated to the received multimedia broadcast data based on the user information together with at least one of the following:

location based information; and time information.

In an embodiment, the method further comprises:

synchronizing the customized marketing information with the received multimedia broadcast data by timely placing the customized advertising information:

at the beginning of the multimedia broadcast;

during the multimedia broadcast; or immediately after the multimedia broadcast.

In an embodiment, the customized marketing information comprises static or interactive content.

In an embodiment, the content is encrypted.

In an embodiment, the content comprises a timestamp based on which the content may be opened for the user.

In an embodiment, the content comprises a timestamp based on which the content may be available for the user.

In an embodiment, the content comprising at least one of the following:

a video stream;

a text-based message; and an audio stream.

In an embodiment, the method further comprises:

determining user information of the multimedia broadcast receiver apparatus based on user access information of the multimedia broadcast receiver.

In an embodiment, the method further comprises: determining user information of the multimedia broadcast receiver apparatus based on user access information of the user apparatus.

In an embodiment, the method further comprises:

providing the customized marketing information via a user interface of the user apparatus using a plurality of marketing frames, each frame comprising customized marketing content.

In an embodiment, at least one of the marketing frames comprising interactive content for the user, the method further comprising:

receiving user interaction information based on the user activity via the user interface of the user apparatus.

In an embodiment, the method further comprises: transmitting the user interaction information for a service server.

In an embodiment, the method further comprises:

defining customized marketing information associated to the received multimedia broadcast data based on the user interaction information.

In an embodiment, the method further comprises:

transceiving configuration information between a server apparatus and the user apparatus;

defining a service account, by the system server, for an advertising service; and maintaining customized marketing information for the service account at the system server.

In an embodiment, the method further comprises:

providing a first multimedia data for the A/V apparatus for displaying on a display of the A/V apparatus; and providing customized marketing information for the user apparatus for displaying on a display of the user apparatus.

In an embodiment, the method further comprises:

determining, by the user apparatus, marketing information settings comprising frame information for defining the frame of the customized marketing information being provided, wherein the frame information defining an amount of marketing frames simultaneously visible to the user.

In an embodiment, the method further comprises:

providing the user an option to purchase more marketing frames; and updating the marketing information settings in response to the user purchasing more marketing frames.

According to a second example aspect of the invention there is provided a multimedia processing apparatus comprising:

a communication interface for communicating with a multimedia router apparatus, a user apparatus, and an A/V output apparatus;

at least one processor; and at least one memory including computer program code;

the at least one memory and the computer program code configured to, with the at least one processor, cause the multimedia processing apparatus to:

connect the multimedia processing apparatus via a first local connection to the A/V output apparatus and via a second local connection to the multimedia router apparatus;

receive multimedia data from a plurality of multimedia data sources;

process the multimedia data from at least one of the plurality of multimedia data sources;

determine user information of the multimedia processing apparatus;

transmit the user information to a service server; and provide the processed multimedia data for the A/V apparatus.

In an embodiment, the multimedia processing apparatus is connected via a first local connection to the A/V output apparatus and via a second local connection to the multimedia router apparatus.

In an embodiment, the plurality of multimedia data sources comprising:

a local multimedia apparatus;

a local network attached storage;

a remote streaming multimedia source;

a digital multimedia broadcasting source; and a remote network attached storage.

According to a third example aspect of the invention there is provided a computer program embodied on a computer readable medium comprising computer executable program code, which when executed by at least one processor of a multimedia processing apparatus, causes the multimedia processing apparatus to:

receive multimedia broadcast data at a multimedia broadcast receiver apparatus;

determine user information of the multimedia broadcast receiver apparatus;

transmit the user information to a service server;

define customized marketing information associated to the received multimedia broadcast data based on the user information;

transmit the customized marketing information to a user apparatus;

determine, by the user apparatus, customized marketing information presentation settings defined by a user; and provide the customized marketing information via a user interface of the user apparatus based on the marketing information presentation settings.

According to a fourth example aspect of the invention there is provided a user apparatus comprising:

a communication interface for communicating with a multimedia router apparatus and a multimedia processing apparatus;

a user input device;

at least one processor; and at least one memory including computer program code;

at least one memory and the computer program code configured to, with at least one processor, cause the user apparatus to:

receive customized marketing information from a service server, the customized marketing information associated to multimedia broadcast data defined based on user information determine marketing information presentation settings defined by a user; and provide the customized marketing information via a user interface of the user apparatus based on the marketing information presentation settings.

In an embodiment, the user input device comprising at least one of the following:

a touch-sensitive display;

a touchpad;

a motion sensor; and a keypad.

In an embodiment, the at least one memory and the computer program code configured to, with the at least one processor, cause the multimedia controlling apparatus to:

detect a gesture on the touch-sensitive display by a user;

determine user interaction information based on the detected gesture; and transmit the user interaction information for the service server.

According to a fifth example aspect of the invention there is provided a service server comprising:

a communication interface for communicating with a user apparatus and a multimedia broadcast receiver apparatus;

at least one processor; and at least one memory including computer program code;

the at least one memory and the computer program code configured to, with the at least one processor, cause the service server to:

transmit multimedia broadcast data to a multimedia broadcast receiver apparatus;

receive user information of the multimedia broadcast receiver apparatus;

define customized marketing information associated to the received multimedia broadcast data based on the user information; and transmit the customized marketing information to a user apparatus.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

For marketers, broadcast TV is one media to convey marketing information. Commercials are bought and sold e.g. based on the popularity of the TV programming (e.g. a movie or a TV show), broadcast time of the programming (primetime is more expensive than non-primetime) or scarcity of the programming.

Marketers can use other methods to market their offering like promote "daily deals" that need to be acted upon e.g. by certain time or by certain number of buyers or participants. Daily deals are often mainly promoted and offered online instead of being offered in conjunction with television programming.

Marketers also use different online or internet enabled tools and methods to assist or carry their marketing communications to consumers, like different ad word or similar type of systems.

So called smartphones and also tablet computer devices are becoming ubiquitous. These devices have as a common feature or capability the possibility to represent or depict audio-visual content and all of them are connected to Internet. There are so called "second screen" efforts made to assist marketers to synchronize the marketing communications between television programming and the above mentioned devices.

Delivery of information or marketing messages to television programming viewers' devices other than television set and in other way than in a television broadcast signal [although a television set and television broadcast signal may be used but is not required to be used]. All devices that are connected, depending on their features, may depict/represent or in other manner display the content that is transported, delivered, produced or made by using the innovation or similarly produced in relation to it.

In an embodiment, software and business process may be combined to provide effective and customized marketing information for users.

A process, an apparatus, a system and a method are provided to enable advertisers and marketers can automatically or with minor user interaction serve the viewer of television programming or consumer with information in an entertaining manner that is non-disturbing in relation to his/her TV programming experience;
customized or personalized;
location based;
timely;
relevant; and
immediately actionable if so desired.

In an embodiment, a new form of media place for advertisers and marketers is described that can be used in addition to or in some instances as replacement of traditional TV media buy or product placement.

In an embodiment, a method and process is described how buyers of media can use a self-service model to buy this new media. The new media is cost effective compared to traditional TV advertising or marketing and it can therefore be used by all marketers also by small and medium sized enterprises. Furthermore, analytical feedback can be received based on user interaction not only to improve campaigning but also to make more targeted marketing.

In an embodiment, marketing and information serving can be done in conjunction or in synchronization with television broadcast but in a consumer friendly non-disturbing manner that enjoyment of TV programming is not disturbed or in fact affected in any manner.

In an embodiment marketing and information serving can be done in conjunction or in sync with television broadcast or irrespective of it to any connected device.

Marketers and advertisement companies are lacking information in order to provide more contextual, local, and relevant ads to consumers. Current methodology is mainly based on statistics and big numbers but this is not enough. There are companies offering second screen services which potentially collect more rich information but that is not in the right level either. More importantly consumers need to want to actively participate into how they would be served.

In the following description, like numbers denote like elements.

Figure 1:
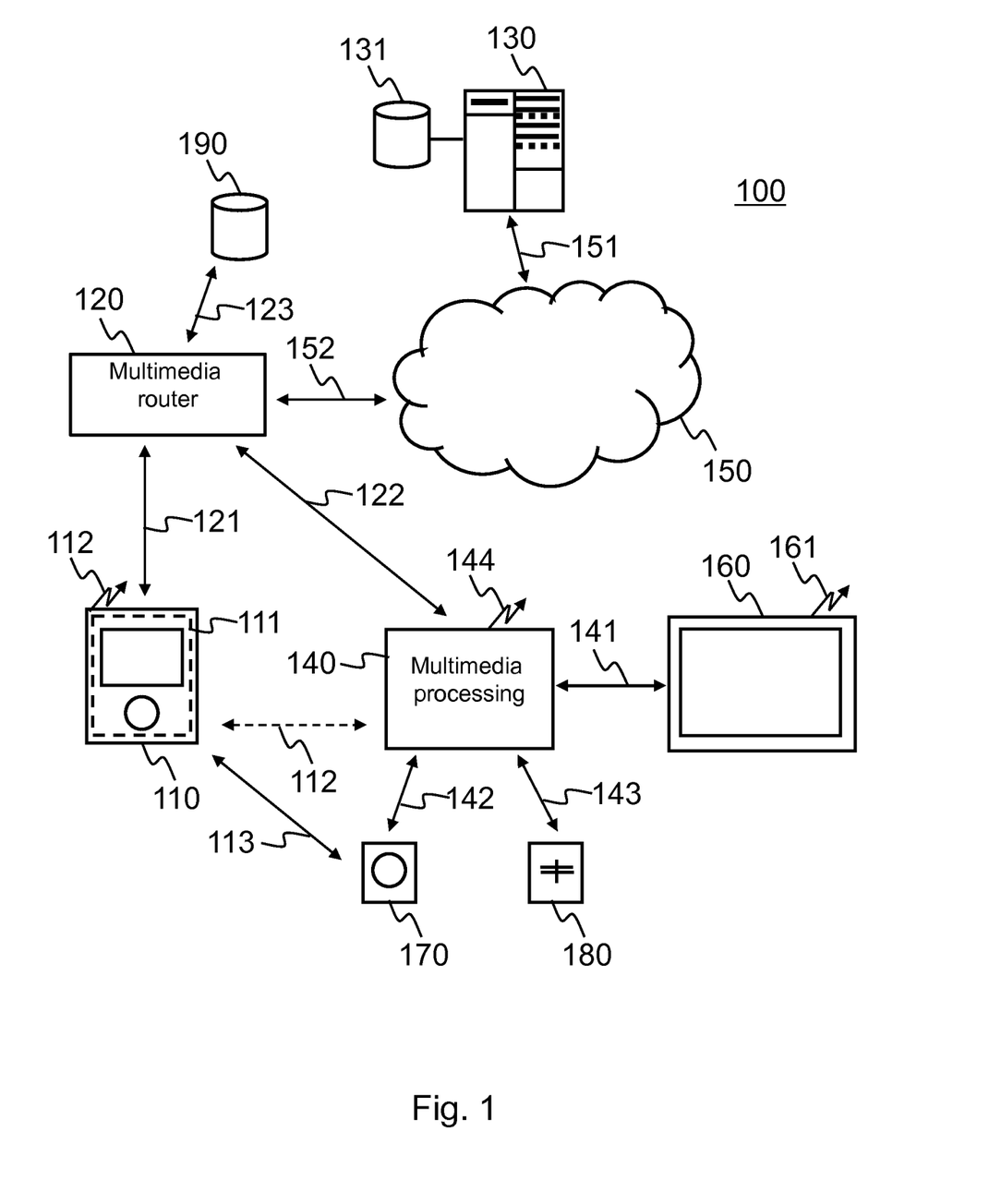
FIG. 1 shows a schematic picture of a system according to an example embodiment of the invention.

FIG. 1 shows a schematic picture of a system 100 according to an example embodiment of the invention.

The system 100 is configured to provide a home entertainment system maximizing good user experience and customized marketing information. A technical architecture of the system 100 is illustrated for components, their relations and communication between each other in addition to needed basic functionality in HW and SW. At the minimum, the system 100 comprises a display for providing the multimedia for the user, a second display for providing customized marketing information to a user, a processing apparatus for processing the multimedia data synchronized with the customized marketing information to be provided for the user, a service server for maintaining and processing the marketing information, and network infrastructure for providing connectivity between the apparatuses. Optionally, further apparatuses may be added, such as peripheral devices for providing or processing the multimedia data and marketing information and communication devices for connecting the peripheral devices to the system 100.

A user apparatus, 110, such as a tablet, a smartphone, a laptop computer or a PDA comprises a user interface 111 for a user. The user apparatus 110 may comprise a multimedia controlling apparatus. The user apparatus 110 is capable of downloading and locally executing software program code. The software program code may be a client application of a service whose processing application is running on a multimedia processing apparatus 140 of the system 100. The user apparatus 110 may comprise a touch-sensitive display 111, for example. The user apparatus 110 is configured to be connectable to a multimedia router apparatus 120 over a local connection 121. The local connection 121 may comprise a wireless local area network (WLAN), for example. The user apparatus 110 may comprise a wireless transceiver 112 for providing a wireless connection to the network 150, such as Internet.

The multimedia router apparatus 120 provides access between local apparatuses 110, 140, 160 and access between a wide area network 150, such as Internet, and the local apparatuses 110, 140, 160. The multimedia router apparatus provides local data connections 121, 122 for the user apparatus 110 and a multimedia processing apparatus 140. The local data connections 121, 122 may comprise wireless local area network (WLAN), Ethernet or universal serial bus (USB), for example. The multimedia router apparatus 120 is connected to the wide area network 150, such as Internet, over a network connection 152. The network connection 152 may comprise a cable TV or an ADSL connection, for example.

In an embodiment, a network attached storage (NAS) 190 may be connected to the multimedia router apparatus 120 as a multimedia data source. The network attached storage (NAS) may comprise multimedia data associated with customized marketing information for the multimedia processing apparatus 140. The network attached storage (NAS) 190 is connected to the multimedia routing apparatus 120 via a local data connection 123. The local data connection 123 may comprise HDMI, USB, WLAN or Ethernet, for example.

In an embodiment, customized marketing information is associated to multimedia data provided to the user. The multimedia data is provided using a first display, such as an A/V output apparatus 160 and the customized marketing information is provided using a second display, such as a user apparatus 110. Method and process is described on how to ensure the best user experience with a setup including a service server, user and A/V output apparatus and optionally also processing apparatuses that all work and communicate together.

The multimedia processing apparatus 140 is controlled by the user apparatus 110 over a virtual control connection 112. Actually the control signal 112 may travel through local connections 121, 122 but for the sake of clarity the control signal 112 is illustrated with a dashed line between the user apparatus 110 and the multimedia processing apparatus 140. The multimedia processing apparatus 140 receives multimedia data associated with customized marketing information from different parts of the system 100 and control signals from the user apparatus and is responsible for the processing of the multimedia data for an A/V apparatus 160. The multimedia processing apparatus 140 is connected over a local connection 141 to the A/V apparatus 160 for providing the processed multimedia data to be presented to the user. The multimedia processing apparatus 140 is configured to process the multimedia data, control quality of service, provide synchronization, collect user behavioral data, and enable service system setup and buffering, for example.

In an embodiment, the user apparatus 110 may further comprise a communication interface for communicating with a local device 160-180, such as a local multimedia apparatus 170, using a sixth local connection 113, wherein the sixth local connection 113 comprises at least one of the following an infrared (IR) connection; and a wireless local area network (WLAN) connection.

In an embodiment, at least one local multimedia apparatus 170, 180 may be connected to the multimedia processing apparatus 140 as a multimedia data source. Such apparatus may comprise a digital camera 170 or a digital video recorder (DVR) 180, for example. The local multimedia apparatus 170, 180 is connected to the multimedia processing apparatus 140 via a local data connection 142, 143. The local data connection 142, 143 may comprise HDMI, USB or SCART, for example.

In an embodiment, the system 100 comprises an A/V apparatus 160 configured to be connectable to the multimedia processing apparatus 140 over a local connection 141. The local connection 141 may comprise a wired connection or a wireless connection. The wired connection may comprise Universal Serial Bus (USB), High-Definition Multimedia Interface (HDMI), SCART interface or RCA interface, for example. The wireless connection may comprise Bluetooth™, Radio Frequency Identification (RF-ID) or wireless local area network (WLAN), for example. Near field communication (NFC) may be used for device identification between the A/V apparatus 160 and the multimedia processing apparatus 140, for example. The A/V apparatus 160 may comprise a television, for example. The A/V apparatus 160 may comprise a transceiver 161 for receiving broadcasted multimedia signal, such as a television signal. The broadcasted multimedia signal may be received over a cable, a terrestrial network or a satellite signal, for example. The transceiver 161 may comprise a plurality of transceivers for different types, for example. Associated to the broadcasted multimedia data, customized marketing information is provided to the user apparatus 110 by the service server 130 or by the multimedia processing apparatus 140.

In an embodiment, the multimedia processing apparatus 140 may further comprise a beacon device 144 for providing wireless control signals over a fifth local connection to any of the local devices, such as an A/V apparatus 160, a local multimedia apparatus 170, 180; and a multimedia controlling apparatus 110. The fifth local connection comprises at least one of the following: an infrared (IR) connection; and a wireless local area network (WLAN) connection. Such beacon device 144 is especially useful for controlling IR controllable devices 160-180 that are out of reach of HDMI CEC and thus not necessarily controllable over local connections 141-143, for example.

In an embodiment, the system 100 comprises a server apparatus 130, which comprises a storage device 131 for storing and providing service data, service metrics and subscriber information, over data connection 151. The service data may comprise customized marketing information, configuration data, account creation data and multimedia data, for example. The service metrics may comprise operator information for use in both user identification and preventing service abuse, as at least one of the user apparatus 110 and the multimedia processing apparatus 140 may be protected by a user account or a service account details. The customized marketing information may be processed based on subscriber information, history data and user information received from the user apparatus 110 or the multimedia processing apparatus 140.

In an embodiment, a proprietary application in the user apparatus 110 or the multimedia processing apparatus 140 may be a client application of a service whose server application is running on the server apparatus 130 of the system 100. The proprietary application may capture the user input data for the service and provide the user output data, for the service using the A/V output apparatus 160. In an embodiment, configuration information between the multimedia processing apparatus 140, the user apparatus 110 and the system server 130 is transceived via the first connections 121, 122, 150, 151, 152 automatically. Thus the user of the user apparatus 110 may not need to do any control for the service. The system server 130 may also maintain account creation process details for the service, such as attaching new apparatuses to the system 100.

In an embodiment, the multimedia controlling apparatus 110 may comprise an A/V input apparatus, such as a microphone or a camera.

Figure 2:
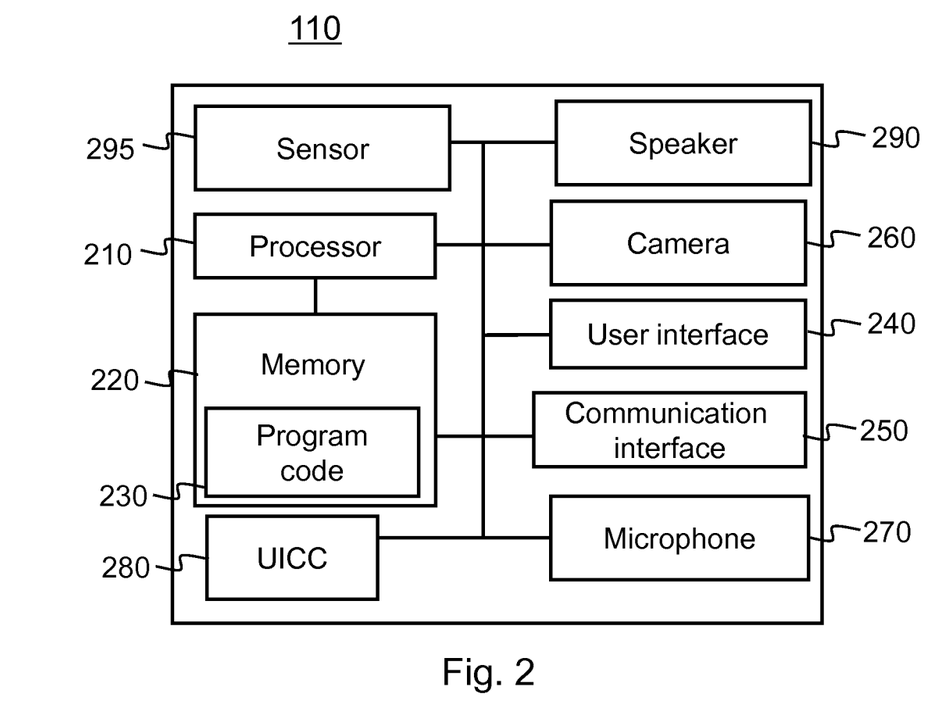
FIG. 2 presents an example block diagram of a user apparatus in which various embodiments of the invention may be applied.

FIG. 2 presents an example block diagram of a user apparatus 110 in which various embodiments of the invention may be applied. The user apparatus 110 may be a user equipment (UE), a tablet, a smartphone, a user device or apparatus, such as a mobile terminal, or other communication device comprising a communication interface, a user interface and optionally a camera, a speaker and a microphone.

The general structure of the user apparatus 110 comprises a user interface 240, a communication interface 250, a microphone 270, a camera 260, a speaker 290, a sensor 295, a processor 210, and a memory 220 coupled to the processor 210. The user apparatus 110 further comprises software 230 stored in the memory 220 and operable to be loaded into and executed in the processor 210. The software 230 may comprise one or more software modules and can be in the form of a computer program product. The user apparatus 110 may further comprise a universal integrated circuit card (UICC) 280. Not all elements of FIG. 2 are necessary but optional for the user apparatus 110, such as the sensor 295, the UICC 280, the speaker 290, the camera 260 and the microphone 270.

The processor 210 may be, e.g., a central processing unit (CPU), a microprocessor, a digital signal processor (DSP), a graphics processing unit, or the like. FIG. 2 shows one processor 210, but the user apparatus 110 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The user apparatus 110 may comprise a plurality of memories. The memory 220 may be constructed as a part of the user apparatus 110 or it may be inserted into a slot, port, or the like of the user apparatus 110 by a user. The memory 220 may serve the sole purpose of storing data, or it may be constructed as a part of an apparatus serving other purposes, such as processing data.

The user interface 240 may comprise circuitry for receiving input from a user of the user apparatus 110, e.g., via a keyboard, a touchpad, a motion sensor, a touch-screen of the user apparatus 110, speech recognition circuitry, gesture recognition circuitry or an accessory device, such as a headset or a remote controller, for example. Furthermore, the user interface 240 may comprise circuitry for providing output for the user via a display, a touch-sensitive display or a lightning device, for example.

The camera 260 may be a still image camera or a video stream camera, capable for creating multimedia data for the user or the used service.

The speaker 290 is configured to provide customized marketing information output audio for the user and to provide user alarm sounds. Thus, the user may start using the customized marketing information before switching on the A/V output apparatus 160 (e.g. TV), for example.

The microphone 270 is configured to capture user speech information for the multimedia service.

The universal integrated circuit card (UICC) 280 is the smart card used in mobile terminals in GSM and UMTS networks. The UICC 280 ensures the integrity and security of all kinds of personal data, and it typically holds a few hundred kilobytes. In a GSM network, the UICC 280 contains a SIM application and in a UMTS network the UICC 280 contains a USIM application. The UICC 280 may contain several applications, making it possible for the same smart card to give access to both GSM and UMTS networks, and also provide storage of a phone book and other applications. It is also possible to access a GSM network using a USIM application and it is possible to access UMTS networks using a SIM application with mobile terminals prepared for this.

The communication interface module 250 implements at least part of data transmission. The communication interface module 250 may comprise, e.g., a wireless or a wired interface module. The wireless interface may comprise such as a WLAN, Bluetooth, infrared (IR), radio frequency identification (RF ID), NFC, GSM/GPRS, CDMA, WCDMA, or LTE (Long Term Evolution) radio module. The wired interface may comprise such as universal serial bus (USB), HDMI, SCART or RCA, for example. The communication interface module 250 may be integrated into the user apparatus 110, or into an adapter, card or the like that may be inserted into a suitable slot or port of the user apparatus 110. The communication interface module 250 may support one radio interface technology or a plurality of technologies. The communication interface module 250 may support one wired interface technology or a plurality of technologies. The user apparatus 110 may comprise a plurality of communication interface modules 250.

A skilled person appreciates that in addition to the elements shown in FIG. 2, the user apparatus 110 may comprise other elements, such as additional microphones, extra speakers, extra cameras, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, user apparatus 110 may comprise a disposable or rechargeable battery (not shown) for powering when external power if external power supply is not available.

In an embodiment, the user apparatus 110 comprises speech or gesture recognition means. Using these means, a pre-defined phrase or a gesture may be recognized from the speech or the gesture and translated into control information for the user apparatus 110, for example.

Figure 3:
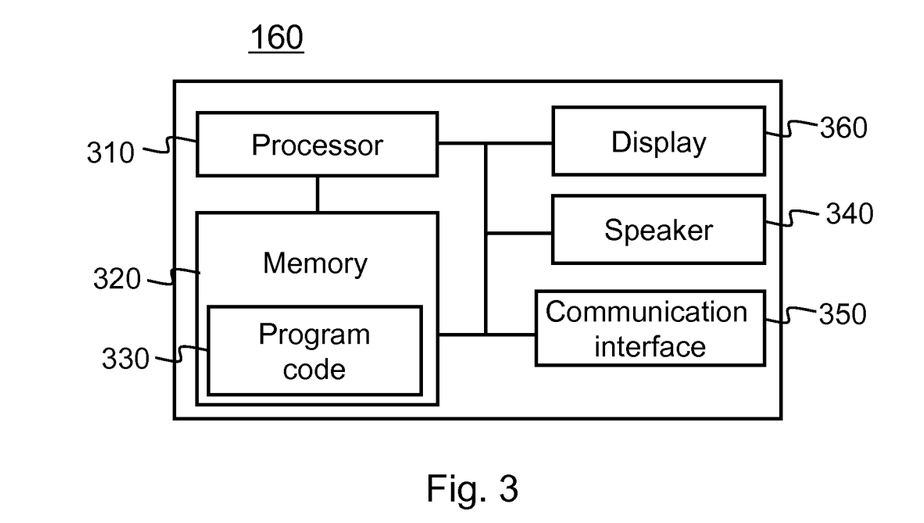
FIG. 3 presents an example block diagram of an A/V output apparatus in which various embodiments of the invention may be applied.

FIG. 3 presents an example block diagram of an A/V output apparatus 160 in which various embodiments of the invention may be applied. The A/V output apparatus 160 may be a television comprising a communication interface, a display and a speaker.

The general structure of the A/V output apparatus 160 comprises a communication interface 350, a display 360, a processor 310, and a memory 320 coupled to the processor 310. The A/V output apparatus 110 further comprises software 330 stored in the memory 320 and operable to be loaded into and executed in the processor 310. The software 330 may comprise one or more software modules and can be in the form of a computer program product.

The processor 310 may be, e.g., a central processing unit (CPU), a microprocessor, a digital signal processor (DSP), a graphics processing unit, or the like. FIG. 3 shows one processor 310, but the A/V output apparatus 160 may comprise a plurality of processors.

The memory 320 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The A/V output apparatus 160 may comprise a plurality of memories. The memory 320 may be constructed as a part of the NV output apparatus 160 or it may be inserted into a slot, port, or the like of the NV output apparatus 160 by a user. The memory 320 may serve the sole purpose of storing data, or it may be constructed as a part of an apparatus serving other purposes, such as processing data.

The speaker 340 may comprise a loudspeaker or multiple loudspeakers. Furthermore, the speaker 340 may comprise a jack for headphones and the headphones. The speaker 340 may also comprise external speakers or external audio devices connected to the A/V apparatus 110, such as home audio systems.

The display 360 may comprise a LED screen, a LCD screen or a plasma screen, for example.

The communication interface module 350 implements at least part of data transmission. The communication interface module 350 may comprise, e.g., a wireless or a wired interface module. The module 350 may comprise a television broadcast transceiver for at least one of the cable, terrestrial or satellite television system. The wireless interface may further comprise such as a WLAN, Bluetooth, infrared (IR) or radio frequency identification (RF ID) radio module. The wired interface may comprise such as universal serial bus (USB), HDMI, SCART or RCA, for example. The communication interface module 350 may be integrated into the A/V output apparatus 160, or into an adapter, card or the like that may be inserted into a suitable slot or port of the A/V output apparatus 160. The communication interface module 350 may support one radio interface technology or a plurality of technologies. The communication interface module 350 may support one wired interface technology or a plurality of technologies. The A/V output apparatus 160 may comprise a plurality of communication interface modules 350.

A skilled person appreciates that in addition to the elements shown in FIG. 3, the A/V output apparatus 160 may comprise other elements, such as microphones, speakers, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the A/V output apparatus 160 may comprise a disposable or rechargeable battery (not shown) for powering when external power if external power supply is not available.

Figure 4:
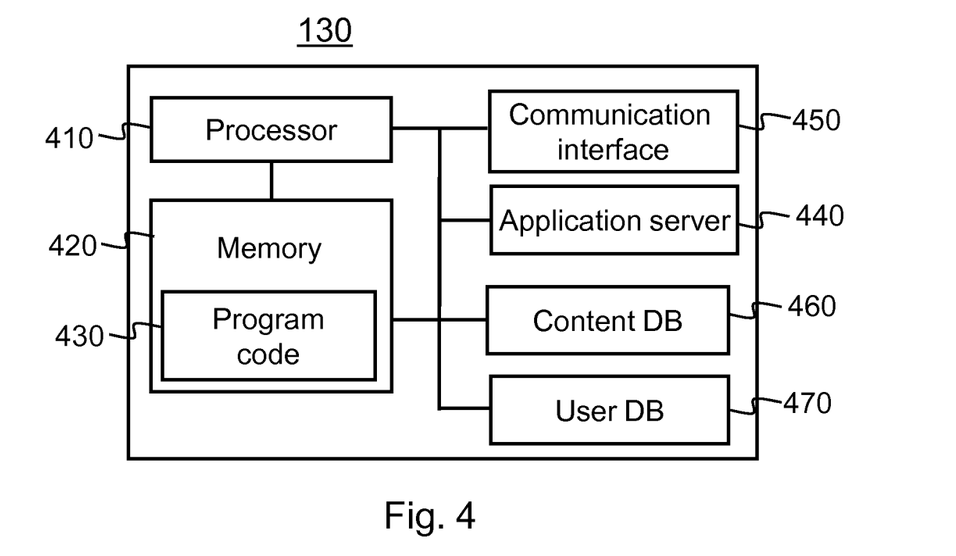
FIG. 4 presents an example block diagram of a server apparatus in which various embodiments of the invention may be applied.

FIG. 4 presents an example block diagram of a server apparatus 130 in which various embodiments of the invention may be applied.

The general structure of the server apparatus 130 comprises a processor 410, and a memory 420 coupled to the processor 410. The server apparatus 130 further comprises software 430 stored in the memory 420 and operable to be loaded into and executed in the processor 410. The software 430 may comprise one or more software modules and can be in the form of a computer program product.

The processor 410 may be, e.g., a central processing unit (CPU), a microprocessor, a digital signal processor (DSP), a graphics processing unit, or the like. FIG. 4 shows one processor 410, but the server apparatus 130 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 130 may comprise a plurality of memories. The memory 420 may be constructed as a part of the server apparatus 130 or it may be inserted into a slot, port, or the like of the server apparatus 130 by a user. The memory 420 may serve the sole purpose of storing data, or it may be constructed as a part of an apparatus serving other purposes, such as processing data.

The communication interface module 450 implements at least part of data transmission. The communication interface module 450 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as Ethernet or universal serial bus (USB), for example. The communication interface module 450 may be integrated into the server apparatus 130, or into an adapter, card or the like that may be inserted into a suitable slot or port of the server apparatus 130. The communication interface module 450 may support one radio interface technology or a plurality of technologies. Configuration information between the user apparatus 110 and the system server 130 may be transceived using the communication interface 450. Similarly, account creation information between the system server 130 and a service provider may be transceived using the communication interface 450.

An application server 440 provides application services e.g. relating to the user accounts stored in a user database 470 and to the service information stored in a service content database 460. The service content information may comprise customized marketing information, association information, multimedia content information, multimedia content management information or metrics information, for example.

A skilled person appreciates that in addition to the elements shown in FIG. 4, the server apparatus 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 5:
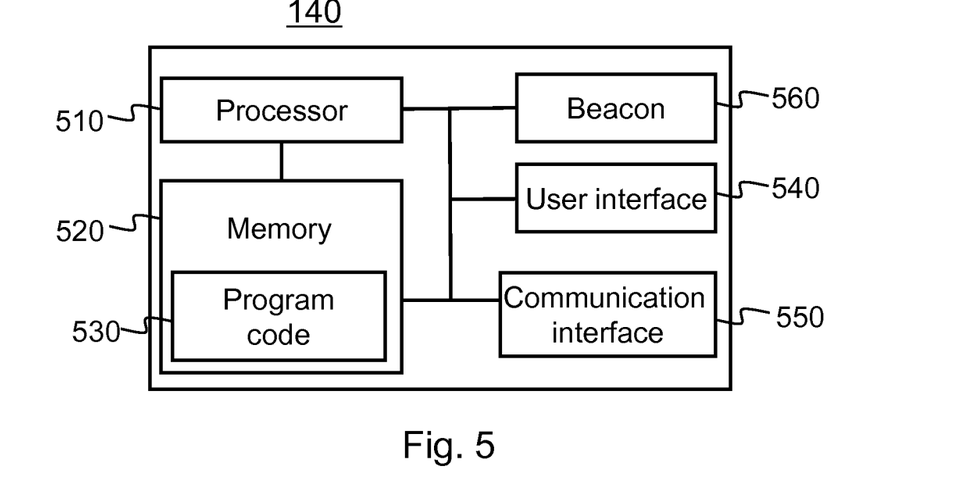
FIG. 5 presents an example block diagram of a multimedia processing apparatus in which various embodiments of the invention may be applied.

FIG. 5 presents an example block diagram of a multimedia processing apparatus 140 in which various embodiments of the invention may be applied.

The general structure of the multimedia processing apparatus 140 comprises a user interface 540, a communication interface 550, a beacon device 560, a processor 510, and a memory 520 coupled to the processor 510. The multimedia processing apparatus 140 further comprises software 530 stored in the memory 520 and operable to be loaded into and executed in the processor 510. The software 530 may comprise one or more software modules and can be in the form of a computer program product. The multimedia processing apparatus 140 does not necessarily comprise all the elements of FIG. 5, for example the user interface 540 and the beacon device 560 may be optional.

In an embodiment, the multimedia processing apparatus 140 may be remotely controlled by an external apparatus, such as the user apparatus 110.

The processor 510 may be a central processing unit (CPU), a microprocessor, a digital signal processor (DSP), a graphics processing unit, or the like. FIG. 5 shows one processor 510, but the apparatus 140 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The multimedia processing apparatus 140 may comprise a plurality of memories. The memory 520 may be constructed as a part of the multimedia processing apparatus 140 or it may be inserted into a slot, port, or the like of the multimedia processing apparatus 140 by a user. The memory 520 may serve the sole purpose of storing data, or it may be constructed as a part of an apparatus serving other purposes, such as processing data.

The user interface 540 may comprise circuitry for receiving input from a user of the multimedia processing apparatus 140, e.g., via a keyboard, graphical user interface shown on the display of the user interface 540 of the multimedia processing apparatus 140, speech recognition circuitry, or an accessory device, such as a headset, and for providing output to the user via, e.g., a graphical user interface or a loudspeaker. Typically the user access and user interface for the multimedia processing apparatus 140 is provided via the multimedia controlling apparatus 110.

The communication interface module 550 implements at least part of radio transmission. The communication interface module 550 may comprise, e.g., a wireless or a wired interface module. The wireless interface may comprise such as a wireless local area network (WLAN), Bluetooth™, infrared (IR), radio frequency identification (RF ID), GSM/GPRS, CDMA, WCDMA, or LTE (Long Term Evolution) radio module. Near field communication (NFC) may be used for device identification between the A/V output apparatus 160 and the multimedia processing apparatus 140. The wired interface may comprise such as universal serial bus (USB), High-Definition Multimedia Interface (HDMI), SCART interface, RCA interface or Ethernet, for example. The communication interface module 550 may be integrated into the multimedia processing apparatus 140, or into an adapter, card or the like that may be inserted into a suitable slot or port of the multimedia processing apparatus 140. The communication interface module 550 may support one radio interface technology or a plurality of technologies. The multimedia processing apparatus 140 may comprise a plurality of communication interface modules 550, both wired and wireless.

In an embodiment, the multimedia processing apparatus may further comprise a beacon device 560 for providing wireless control signals over a fifth local connection to at least one of the following devices: an A/V apparatus; a local multimedia apparatus; and a multimedia controlling apparatus. The beacon device 560 may be integrated to the multimedia processing apparatus 140 or connected to the apparatus 140 as a separate device 560. The fifth local connection comprises at least one of the following: an infrared (IR) connection; and a wireless local area network (WLAN) connection. The beacon device 560 may also be integrated to the communication interface 550 of the apparatus 140.

A skilled person appreciates that in addition to the elements shown in FIG. 5, the multimedia processing apparatus 140 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the multimedia processing apparatus 140 may comprise a disposable or rechargeable battery (not shown) for powering when external power if external power supply is not available.

In an embodiment, information about usage patterns, customized marketing information, behavioral data for a multimedia source and responded marketing information and multimedia data content may be collected. Such patterns and data may be used for predictive multimedia source selection or market intelligence, for example.

In an embodiment, at least two of a multimedia controlling apparatus, a multimedia processing apparatus, a multimedia routing apparatus and an NV output apparatus may be automatically set up when connected with each other with reduced user interaction.

In an embodiment, channel hopping is provided for multimedia data received from a plurality of multimedia data sources, both local and remote. Such hopping activity is analog to traditional tuner based TV channels but now with universal content combining all available content sources and content. User will perceive exactly the same experience like with traditional TV while the content is not brought to user by readily broadcasted channels but as individual content items, frames or virtual channels. As a user experience while user selects "next" (or similar) then the next content is played meaningfully. To be more specific it does not necessarily mean that e.g. a show or movie would start from the beginning but that they would start with trailer or even from the middle of the stream. The user may also personalize the experience. Each multimedia data received from a plurality of multimedia data sources may be associated with customized marketing information that is to be provided to the user by the user apparatus 110.

In an embodiment, the multimedia data and the associated customized marketing information may be updated dynamically. For example, the multimedia data stored to a local storage 190, such as NAS, may be selected by the user. The multimedia data may be dynamically associated updated marketing information from the server 130 before starting to provide the multimedia and marketing information for the user. Thus, no matter the stored multimedia data is stored some time ago the customized marketing information is always up-to-date. The marketing information may be updated to the multimedia data periodically and stored as associated marketing data with the multimedia data or updated on the fly whenever the user selects a certain multimedia data for displaying.

Exact content of multimedia data may be indicated based on metadata information of the multimedia data to recognize the content. The metadata information may be transmitted to the server. Based on the metadata information the server is capable of processing customized marketing information for the user apparatus for displaying to the user.

Typically users have multiple sources of media such as TV tuner, DVR, home network-attached storage (NAS) and Internet. Source for the content is important for the system but it should be insignificant for the user. No matter which source is used, the customized marketing information is processed by the server and provided to the user apparatus as up-to-date. At least user information is transmitted to the server for triggering the customized marketing information processing.

In an embodiment, a combination a plurality of multimedia data sources may be used. Accurate source description and method of discovery for any specific content, content type, or content subclass may be provided. Furthermore, means for following multimedia data content even though the physical source has been changed may be provided. This provides a perfect abstraction to the user so that only thing that the user sees is the content and customized marketing information itself without need to bother with technology.

A second screen, a display of the user apparatus, contains all the controls and customized marketing information while TV screen is left entirely for the content, e.g. video. This means a set up where the second screen and TV screen are totally aware of each other's status and become as if they were totally integrated. This significantly reduces user's fatigue, improves overall user experience and also provides better means for people with disabilities as the total control is at same place and close to viewer.

Personal profiles within a group of users (e.g. family) may be defined. They may be used as a security mean but also specifically for storing favorites, usage patterns and network behavior (social).

UI gestures may be defined for the user apparatus for general control of the service, such as volume/mute at any state. The user may define and teach the user apparatus for different gestures.

In an embodiment, predictive intelligent buffering is provided. In order to create immediate playback of any content, several videos (or any other content like music) may be processed in advance to wait for the play command. After the user selects "play" the content is played on the A/V output apparatus instantly and the customized marketing information is provided by the user apparatus. This means that the system provides means of processing content for playback in parallel, making buffered content readily available for the player and also gives methods for predicting next moves of the user and so limiting intelligently the number of required parallel processes.

Figure 6:
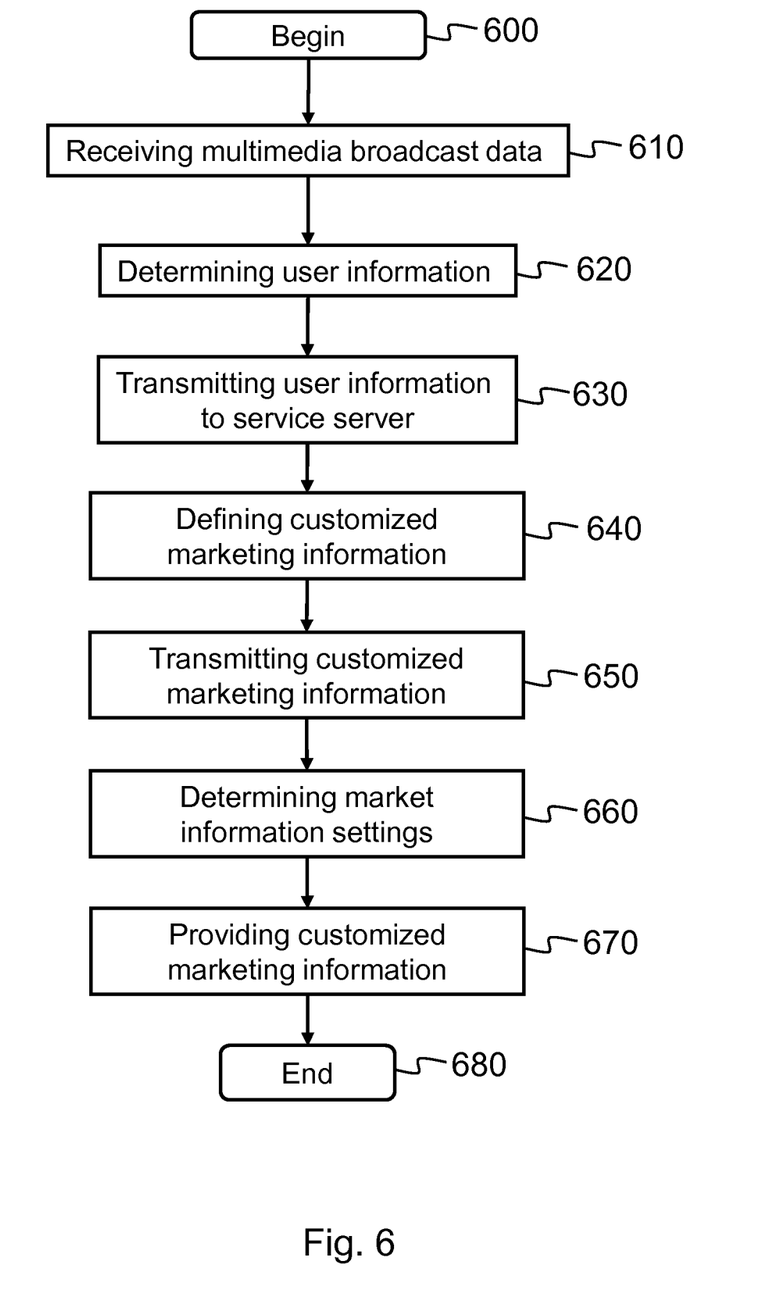
FIG. 6 shows a flow diagram showing operations of providing customized marketing associated to multimedia broadcasting in accordance with an example embodiment of the invention.

FIG. 6 shows a flow diagram showing operations of providing customized marketing associated to multimedia broadcasting in accordance with an example embodiment of the invention. In step 600, the method is started. In step 610, multimedia broadcast data is received at a multimedia broadcast receiver apparatus. In step 620, user information of the multimedia broadcast receiver apparatus is determined. In step 630, the user information is transmitted to a service server. In step 640, customized marketing information associated to the received multimedia broadcast data is defined based on the user information. In step 650, the customized marketing information is transmitted to a user apparatus. In step 660, marketing information settings are determined, by the user apparatus. In step 670, the customized marketing information is provided via a user interface of the user apparatus based on the marketing information settings. The method is ended in step 680.

Figure 7:
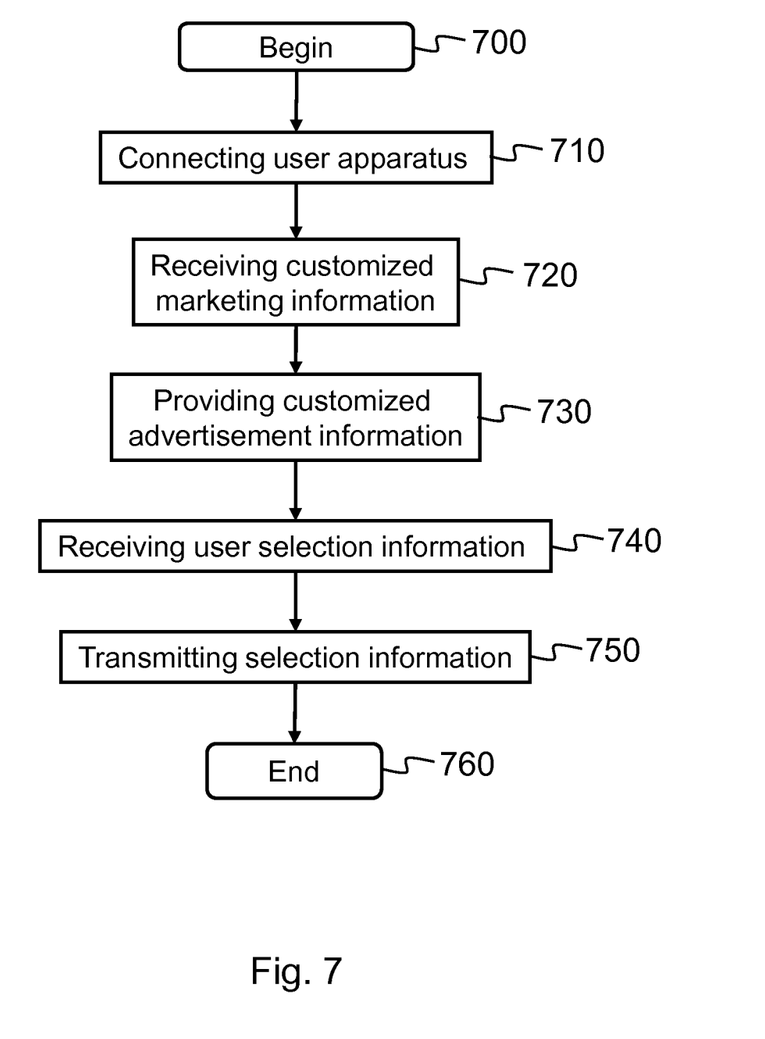
FIG. 7 shows a flow diagram showing operations of a user apparatus in accordance with an example embodiment of the invention

FIG. 7 shows a flow diagram showing operations of a user apparatus in accordance with an example embodiment of the invention. In step 700, the method is started. In step 710, the user apparatus is connected to the multimedia router apparatus. In step 720, customized marketing information associated to multimedia data from a plurality of multimedia data sources is received. In step 730, customized marketing information associated to the active multimedia data (shown e.g. at the same time on the A/V output apparatus) is provided for a user on a display of the user apparatus. In step 740, user selection information for at least one of the customized marketing information is received. In step 750, selection information is transmitted for the service server in response to user selection information. The method is ended in step 760.

Figure 8:
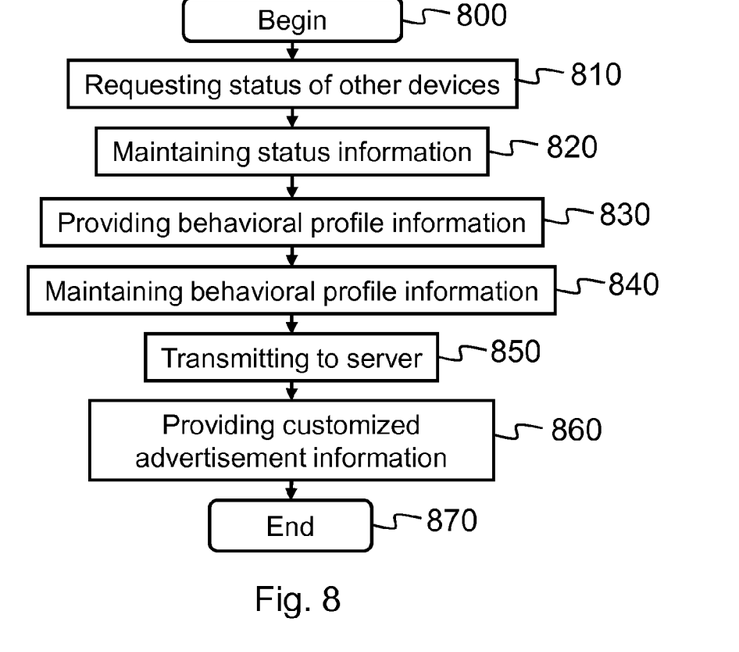
FIG. 8 shows a flow diagram showing operations of collecting local user and device information for service implementation in accordance with an example embodiment of the invention.

FIG. 8 shows a flow diagram showing operations of collecting local user and device information for service implementation in accordance with an example embodiment of the invention. In step 800, the method is started. In step 810, status of other devices connected to the system is requested. In step 820, at least one of the controlling apparatus and the processing apparatus maintains status information of all connected devices. The status information may be requested by a master device, such as the controlling or processing apparatus, or all devices may send their status information automatically. In step 830, behavioral profile information is provided. The behavioral profile information may be collected by at least one of the controlling and the processing apparatus and reflect the user activity and interests for certain multimedia source, type, language, geographical area, time, etc. In step 840, the behavioral profile information is maintained by at least one of the controlling and the processing apparatus. In step 850, the maintained status information and behavioral profile information may be transmitted to the system server for storing and further processing for the customized marketing information, for example. In step 860, customized marketing information to the user may be provided using the status information and the user behavioral profile information. The customized marketing information may be processed locally by the user apparatus or processing apparatus or remotely by the system server, and provided to the user via the user interface of the user apparatus, for example. In step 870, the method is ended.

Figure 9:
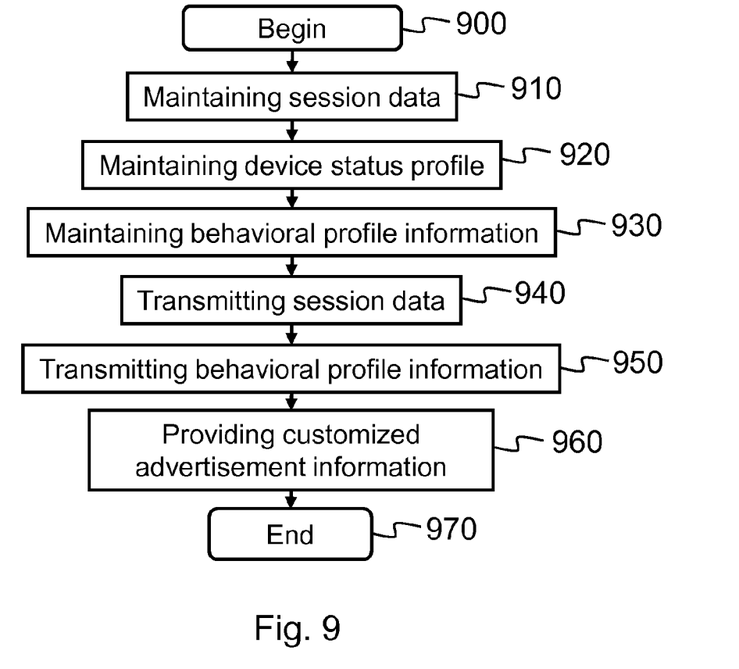
FIG. 9 shows a flow diagram showing operations of service analytics implementation in accordance with an example embodiment of the invention.

FIG. 9 shows a flow diagram showing operations of service analytics implementation in accordance with an example embodiment of the invention. In step 900, the method is started. In step 910, session data is maintained by a user apparatus. The session data may comprise user account information used for logging in to the service by the user via the user apparatus. Furthermore the session data may comprise user activity data of the user apparatus during the session. In step 920, device status profile is maintained by the processing apparatus. The device status profile may status information of all available devices in the system. In step 930, behavioral profile information is maintained by the processing apparatus. In step 940, the session data is transmitted to the system server by the user apparatus. The transmitted session data is encrypted before transmitting the data to the system server. In step 950, the behavioral profile information is transmitted to the system server by the processing apparatus. The transmitted behavioral profile information is encrypted before transmitting the information to the system server. The behavioral profile information may further be processed before transmitting to provide usage model forecast information based on the behavioral profile information. At least one of the behavioral profile information and the usage model forecast information is then encrypted and transmitted to the system server. In step 970, customized marketing information is provided by the system server using at least one of the received session data, device status profile, behavioral profile information, and usage model forecast information. The customized marketing information is displayed to the user using the user apparatus. In step 970, the method is ended.

Figure 10:
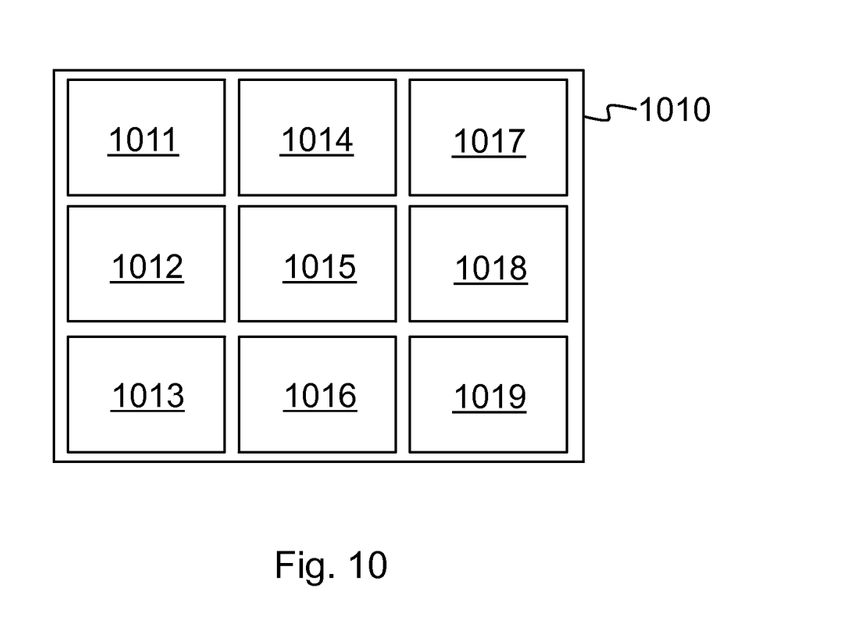
FIG. 10 shows an example block diagram of a user apparatus display in which various embodiments of the invention may be applied.

FIG. 10 shows an example block diagram of a user apparatus 110 display 1010 in which various embodiments of the invention may be applied.

In an embodiment, customized marketing information is provided to the user using 3×3 frames 1011-1019. The frames 1011-1019 may be static or interactive and enable the user to execute "buy the media transactions" or make bids for media purchase during a predefined time or until a certain price point is reached, for example. The customized marketing information 1011-1019 is processed by the service server, associated to multimedia data provided using the A/V output apparatus and synchronized to the multimedia data by the user apparatus, the service server or the multimedia processing apparatus, for example. The customized marketing information 1011-1019 may relate to the multimedia data that it is associated to or the user information that is consuming the multimedia data or both.

In an embodiment, the service server is responsible for matching the marketing bids. The media sold using the customized marketing information is always scarce, i.e. if the targeted media is related to a specific TV programming, the server will take in buy orders only insofar as the inventory is sold out and then automatically informs that the inventory is sold out and then recommends automatically other suitable inventory available.

In terms of business logic the server can contain any number of business logics, including but not limited to revenue share with any number of participants.

A content management system takes care of the actual information placement to the user apparatus display 1010. A web user interface is provided to potential buyers of media, i.e. the users of the user apparatuses. Suitability of content may be checked before providing to the user and filtering may be done. Such filtering parameters may be defined by the user to the user profile information or by the service server based on the multimedia data type the marketing is associated to.

In an embodiment, if the marketing content 1011-1019 is TV programming related, a marketing/media sync server is used to serve, transport and deliver the 3×3 fields 1011-1019 via network connection to the user apparatus display 1010 of his/her smartphone or tablet computer, for example.

The customized marketing information 1011-1019 is delivered to the connected user apparatus either at the beginning, during or immediately after the programming in question, for example.

The customized marketing information 1011-1019 delivered to the connected device can be so called static or interactive content and it can be in any form or format and it may be encrypted or otherwise protected. The customized marketing information 1011-1019 can be immediately accessible or contain a timestamp after which it can be opened.

In an embodiment, only the receiver of the content may click one "icon" 1011-1019 of the customized marketing information which will enable her to activate various items or frames. Such items or frames may comprise, for example, to immediately buy tickets to a baseball game at a 15% discount, to refinance her loan with lower margin, to receive information that the local grocery store 0.2 miles away from her home is having all fruits discounted by 20% within the next 4 hours or to be time stamped in a manner that only 100 first will get the new hot shot authors book personally signed/autographed.

The service server may collect adequate information to enable the marketers to further improve their services benefiting the consumer.

In an embodiment, a cost effective self-serving customized marketing model is made possible and the customized marketing information also relates to TV programming while at the same time makes programming more valuable.

At least some embodiments enable customized marketing information provided to the user that is relevant to the user and provided non-disruptively and interactively, if desired. The customized marketing information is not just prior known advertising and synchronizing advertisements to the broadcast data but an intelligent and user customized marketing information. The system also enables actionable marketing communications, e.g. a service provider providing free one-hour service for the first hundred users clicking on the marketing item or frame and filling required user information.

The system thus ties together defining user customized marketing information based on available data, daily deal type of component (optionally interactive) and providing the marketing information to users. All this can be done automatically based on user settings and user information.

In an embodiment, the customized marketing information may be provided to the user via a second screen and the broadcasted data via a first screen, wherein the first screen is comprised by an A/V output apparatus such as a TV and the second screen is comprised by a user apparatus, such as a tablet. In case the user has several user apparatuses, different customized marketing information may be provided with different user apparatuses.

In an embodiment, only the second screen is used, wherein the received multimedia data is provided to the user apparatus via a multimedia router, for example. Also the customized marketing information is provided to the user apparatus via the multimedia router, for example. The customized marketing information is then provided by the user apparatus to the user together with the received multimedia data non-disruptively based on user settings.

In an embodiment, the marketing information settings comprises at least one of the following: user interface selection information for identifying the user interface on which the customized marketing information being provided; outlook information for defining the outlook of the customized marketing information being provided; frame information for defining the frame of the customized marketing information being provided; and timing information for defining timing of the customized marketing information being provided to the user. The outlook information may comprise, for example, settings for providing the marketing information to the user, such as location of the marketing information on a display, colors, fonts, shapes and audio used. The frame information may comprise, for example, number of marketing frames provided simultaneously and their shape and graphics. The timing information may comprise, for example, time information how long the marketing frames are available to the user and how often the marketing frames are updated.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method for providing customized marketing associated to multimedia broadcasting, comprising:
    selecting, by a user of a multimedia broadcast receiver apparatus, a source of multimedia broadcast data;
    receiving, from the user selected source, multimedia broadcast data at the multimedia broadcast receiver apparatus;
    determining user information of the user of the multimedia broadcast receiver apparatus, wherein the user information comprises a user history of received multimedia broadcast data;
    transmitting the user information to a service server;
    defining customized marketing information associated to the received multimedia broadcast data based on the user information;
    transmitting the customized marketing information to a user apparatus;
    determining, by the user apparatus, marketing information settings; and
    providing the customized marketing information via a user interface of the user apparatus based on the marketing information settings.

2. The method of claim 1, wherein the user apparatus being different than the multimedia broadcast receiver apparatus.

3. The method of claim 1, wherein the user apparatus comprising the multimedia broadcast receiver apparatus.

4. The method of claim 1, wherein the marketing information settings comprises at least one of the following:
    user interface selection information for identifying the user interface on which the customized marketing information being provided;
    outlook information for defining the outlook of the customized marketing information being provided;
    frame information for defining the frame of the customized marketing information being provided; and
    timing information for defining timing of the customized marketing information being provided to the user.

5. The method of claim 4, wherein the customized marketing information being provided with at least one of the following ways:
    before providing the received multimedia broadcast data to the user;
    during a break in providing the received multimedia broadcast data to the user;
    after providing the received multimedia broadcast data to the user; and
    via a different user interface than providing the received multimedia broadcast data to the user.

6. The method of claim 1, wherein the marketing information settings being defined by at least one of the following:
    the user;
    the service provider; and
    the marketing information provider.

7. The method of claim 1, wherein the user information comprises at least one of the following:
    user sex;
    user age;
    user place of birth;
    user location;
    user points of interests;
    user profile information from an external service; and
    user history of received multimedia broadcast data.

8. The method of claim 7, wherein the external service comprising at least one of the following:
    a social network service;
    a cloud service;
    a bank service; and
    a multimedia streaming service.

9. The method of claim 1, further comprising:
    providing the customized marketing information with reduced disruption to the received multimedia broadcast data.

10. The method of claim 1, further comprising:
    synchronizing the customized marketing information with the received multimedia broadcast data.

11. The method of claim 1, wherein the multimedia broadcast receiver comprising an A/V output apparatus or a multimedia processing apparatus, and the source of multimedia broadcast data comprising at least one of the following: a TV tuner, a DVR, and a home network-attached storage (NAS).

12. The method of claim 1, wherein the user apparatus comprising a multimedia controlling apparatus.

13. The method of claim 1, further comprising:
    defining customized marketing information associated to the received multimedia broadcast data based on the user information together with at least one of the following:
    location based information; and
    time information.

14. The method of claim 1, further comprising synchronizing the customized marketing information with the received multimedia broadcast data by timely placing the customized advertising information:
    at the beginning of the multimedia broadcast;
    during the multimedia broadcast; or
    immediately after the multimedia broadcast.

15. The method of claim 1, wherein the customized marketing information comprising static or interactive content.

16. The method of claim 15, wherein the content is encrypted.

17. The method of claim 15, wherein the content comprises a timestamp based on which the content may be opened for the user.

18. The method of claim 15, wherein the content comprises a timestamp based on which the content may be available for the user.

19. The method of claim 15, wherein the content comprising at least one of the following:
    a video stream;
    a text-based message; and
    an audio stream.

20. The method of claim 1, further comprising:
determining user information of the user of the multimedia broadcast receiver apparatus based on user access information of the multimedia broadcast receiver.

21. The method of claim 1, further comprising:
determining user information of the user of the multimedia broadcast receiver apparatus based on user access information of the user apparatus.

22. The method of claim 1, further comprising:
providing the customized marketing information via a user interface of the user apparatus using a plurality of marketing frames, each frame comprising customized marketing content.

23. The method of claim 22, wherein at least one of the marketing frames comprising interactive content for the user, the method further comprising:
receiving user interaction information based on the user activity via the user interface of the user apparatus.

24. The method of claim 23, further comprising:
transmitting the user interaction information to a service server.

25. The method of claim 24, further comprising:
defining customized marketing information associated to the received multimedia broadcast data based on the user interaction information.

26. The method of claim 1, further comprising:
transceiving configuration information between a server apparatus and the user apparatus;
defining a service account, by the system server, for a marketing service; and
maintaining customized marketing information for the service account at the system server.

27. The method of claim 1, further comprising:
providing a first multimedia data for an A/V apparatus for displaying on a display of the A/V apparatus; and
providing customized marketing information for the user apparatus for displaying on a display of the user apparatus.

28. The method of claim 1, further comprising:
determining, by the user apparatus, marketing information settings comprising marketing frame information for defining the frame of the customized marketing information being provided, wherein the frame information defining an amount of marketing frames simultaneously visible to the user.

29. The method of claim 28, further comprising:
providing the user an option to purchase more marketing frames; and
updating the marketing information settings in response to the user purchasing more marketing frames.

30. A computer program embodied on a computer readable non-transitory medium comprising computer executable program code, which when executed by at least one processor of a multimedia processing apparatus, causes the multimedia processing apparatus to:
select, by a user of a multimedia broadcast receiver apparatus, a source of multimedia broadcast data;
receive, from the user selected source, multimedia broadcast data at the multimedia broadcast receiver apparatus;
determine user information of a user of the multimedia broadcast receiver apparatus, wherein the user information comprises a user history of received multimedia broadcast data;
transmit the user information to a service server;
define customized marketing information associated to the received multimedia broadcast data based on the user information;
transmit the customized marketing information to a user apparatus;
determine, by the user apparatus, customized marketing information presentation settings defined by a user; and
provide the customized marketing information via a user interface of the user apparatus based on the marketing information presentation settings.

31. A user apparatus comprising:
a communication interface for communicating with a multimedia router apparatus and a multimedia processing apparatus;
a user input device;
at least one processor; and
at least one memory including computer program code;
at least one memory and the computer program code configured to, with at least one processor, cause the user apparatus to:
receive customized marketing information from a service server, the customized marketing information associated to multimedia broadcast data defined based on user information, wherein the user information comprises a user history of received multimedia broadcast data from a source of multimedia broadcast data, at a multimedia broadcast receiver apparatus, the source selected by a user of the multimedia broadcast receiver apparatus;
determine marketing information presentation settings defined by a user; and
provide the customized marketing information via a user interface of the user apparatus based on the marketing information presentation settings.

32. A service server comprising:
a communication interface for communicating with a user apparatus and a multimedia broadcast receiver apparatus;
at least one processor; and
at least one memory including computer program code;
the at least one memory and the computer program code configured to, with the at least one processor, cause the service server to:
transmit multimedia broadcast data to a multimedia broadcast receiver apparatus;
receive user information of a user of the multimedia broadcast receiver apparatus, wherein the user information comprises a user history of received multimedia broadcast data from a source of the multimedia broadcast data, at the multimedia broadcast receiver apparatus, the source selected by the user of the multimedia broadcast receiver apparatus;
define customized marketing information associated to the received multimedia broadcast data based on the user information; and
transmit the customized marketing information to a user apparatus.

* * * * *